United States Patent [19]

Wagoner

[11] 4,221,052
[45] Sep. 9, 1980

[54] SIGN CUTTING MACHINE

[75] Inventor: James E. Wagoner, Swanton, Ohio

[73] Assignee: Quality Industries, Hillsdale, Mich.

[21] Appl. No.: 967,237

[22] Filed: Dec. 7, 1978

[51] Int. Cl.³ .............................................. B43L 13/10
[52] U.S. Cl. .................................. 33/25 B; 33/23 H; 33/23 K; 409/86
[58] Field of Search ............ 33/25, 23 D, 23 H, 23 K; 409/86, 126

[56] References Cited

U.S. PATENT DOCUMENTS

| | | | |
|---|---|---|---|
| 2,496,781 | 2/1950 | Eichmann | 33/25 E |
| 2,881,521 | 4/1959 | Pearson | 33/25 R |
| 3,110,966 | 11/1963 | Hillig | 33/25 B |
| 3,145,623 | 8/1964 | Fillmore et al. | 409/126 |
| 3,171,207 | 3/1965 | Wormser | 33/23 |
| 3,830,136 | 8/1974 | Sprenger | 409/86 |

Primary Examiner—Charles E. Phillips
Attorney, Agent, or Firm—Beaman & Beaman

[57] ABSTRACT

The invention pertains to apparatus for forming signs with a motor driven router. A frame defines a surface for supporting the sign panel to be routed, usually wood, and for supporting the letter forming templates. A carriage linearly movable upon the frame supports a polygonal, four-sided linkage, a template follower is mounted upon one of the links, and the router is also link-mounted. By varying the position of the linkage pivot points relative to each other, and the location of the template follower, a variety of letter styles can be produced from a single template, and a characteristic of the apparatus lies in the excellent visibility provided of the router during operation.

4 Claims, 11 Drawing Figures

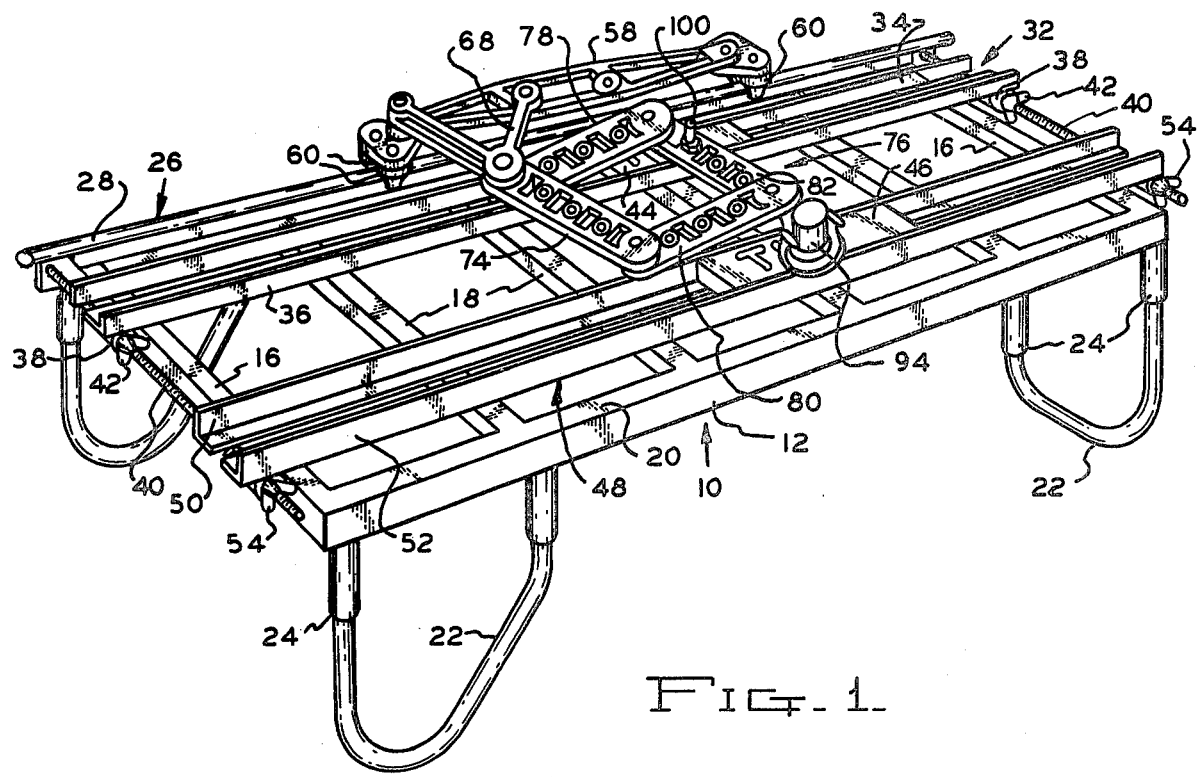
FIG_1
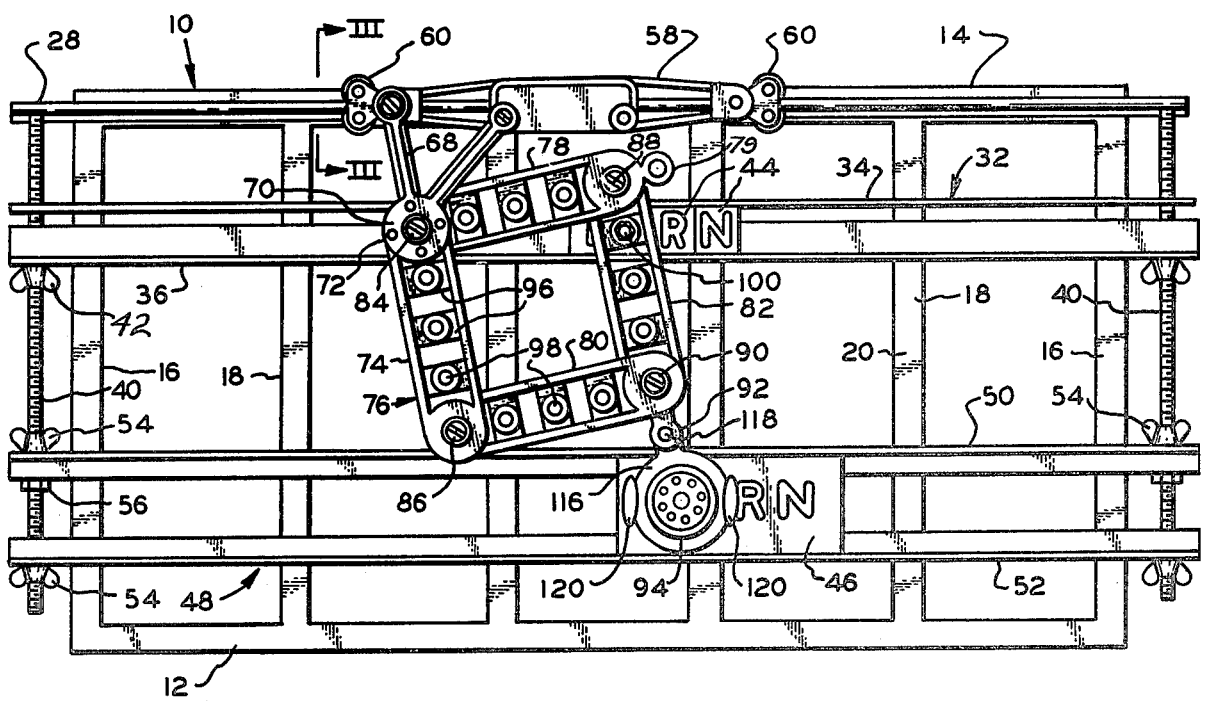
FIG_2

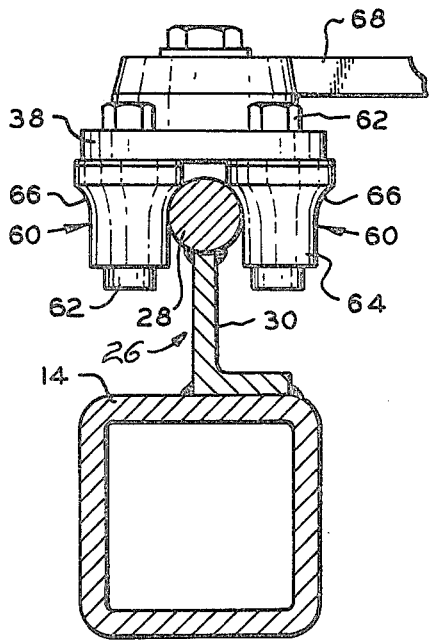
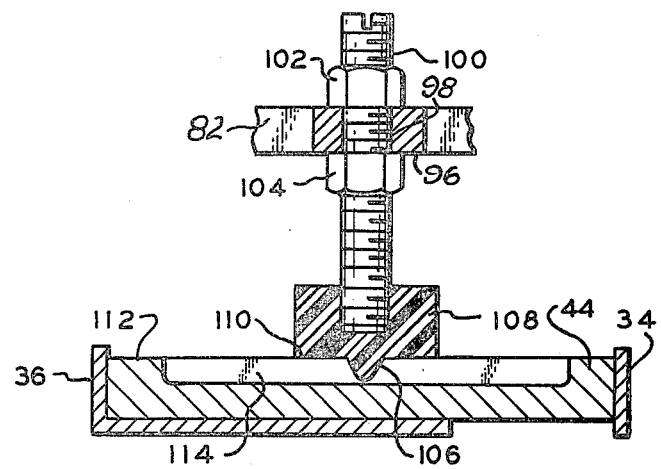
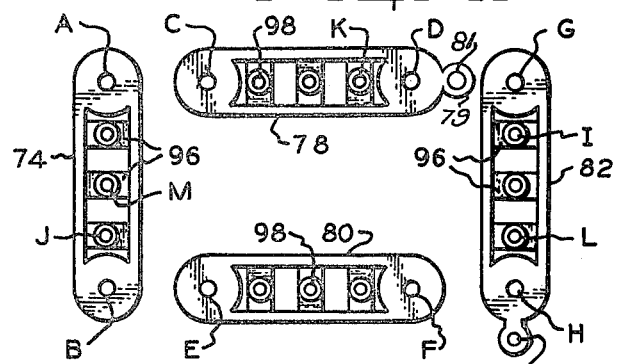
STANDARD  FIG. 6.
SLANT  FIG. 7.
LEFTY  FIG. 8.
RUSTIC  FIG. 9.
LEFTY MOD  FIG. 10.
SCRIPT  FIG. 11.

SIGN CUTTING MACHINE

BRIEF DESCRIPTION OF THE INVENTION

The invention pertains to machines for forming signs by routing the indicia in the sign material, usually wood, the router being guided by a template.

Signs have long been formed by routing techniques wherein the indicia is carved or cut into a panel. Routed signs are widely used in recreation areas, such as parks, campgrounds and the like, and machines for the template forming of such signs are often owned by the land proprietor, municipality or government agencies, and are often operated by relatively unskilled personnel. One machine of the aforedescribed type is shown in U.S. Pat. No. 3,171,207, and while the machine shown in this patent is of a relatively economical nature, and can be operated by relatively unskilled personnel, the fact that the panel being routed is remotely located with respect to the operator decreases his visibility, and the means for supporting the router and templates does not permit variations between router and template guide movements whereby letter variations can be produced from a common template.

It is an object of the invention to provide a router-type sign cutting machine wherein the apparatus may be operated by relatively unskilled personnel and yet indicia variations can be produced from a common template.

An additional object of the invention is to provide sign cutting apparatus utilizing templates, a template follower and a router wherein excellent router visibility during operation is provided and improved access to the sign panel supporting portion of the machine is achieved.

Another object of the invention is to provide a router-type sign cutting machine utilizing a template and template follower wherein a pantograph type linkage is employed to support the template follower and router permitting variations in movement between the template follower and router.

The sign cutter in accord with the invention includes a frame having an upper planar surface which includes clamping means for supporting the template and the panel to be routed. Along a lateral side of the frame a track is mounted upon which a carriage is linearally movable upon rollers. This carriage supports a pantograph type linkage consisting of four links, one of which is fixed to the carriage, two elements being pivotally mounted to the fixed link, and the fourth link being pivotally mounted to the two pivoted links. A template follower selectively positionable upon the links extend below for engagement with the indicia grooves of the template, and the router is fixed to the fourth link. After positioning of the template and sign panel, the operator grasps the router handle and raises and lowers the router and linkages to selectively engage and disengage the template follower with the templates and the router with the sign panel.

By relocating the template follower upon the linkages, and varying the location of the pivot points of the linkages, indicia variations may be produced from a common template configuration, and the sign cutting machine of the invention provides a wider variety of indicia from a single set of templates than machines of this type have previously offered.

BRIEF DESCRIPTION OF THE DRAWINGS

The aforementioned objects and advantages of the invention will be appreciated from the following description and accompanying drawings wherein:

FIG. 1 is a perspective view of sign cutting apparatus in accord with the invention, FIG. 2 is a plan view of the sign cutting apparatus, FIG. 3 is an enlarged, detail, elevational sectional view taken through the track along Section III—III of FIG. 2, FIG. 4 is an elevational, detail, enlarged view taken through the template and illustrating the template follower, partially in section.

FIG. 5 is an exploded plan view of the linkages constituting the support for the router, and FIGS. 6–11 are variations of the types of indicia capable of being produced by a single type of block letter templates.

DESCRIPTION OF THE PREFERRED EMBODIMENT

The relationship of the components of sign cutting apparatus in accord with the invention is best appreciated from FIGS. 1 and 2. The apparatus includes a frame generally indicated at 10 which is of a rectangular configuration including side rails 12 and 14 interconnected at their ends by end rails 16 and stringers 18 interconnect the side rails intermediate the ends. The aforedescribed components may be formed of rectangular tubing, as apparent in FIG. 3, and are welded to form a rigid flat upper supporting surface 20. The frame members defining the supporting surface 20 are mounted upon formed legs 22 received within hollow sockets 24 welded to and extending downwardly from side rails 12 and 14.

The "rear" rail 14 serves as the support for the linear track 26. The track 26, FIG. 3, consists of a cylindrical rod 28 welded to the top of an angle 30 whose base is welded to the upper surface of the rear side rail 14. As will be appreciated from FIGS. 1 and 2, the ends of the rod 28 extend beyond the end rails 16 to provide carriage support when cutting a sign panel of a length substantially equal to that of the table.

A pair of vises or clamps are defined upon the table supporting surface 20. The template clamp 32 includes an elongated jaw bar 34 which extends parallel to the table length and is welded to the end rails 16 and stringers 18. The template jaw 36 is movably mounted on the table support surface 20 parallel to the bar 34, and consists of an angle iron laying across the support surface wherein its ends extend beyond the end rails 16, and tubular collars 38 are welded to the underside thereof. Threaded rods 40 are attached at their rear ends to the frame 10 for fixing the associated rod with respect to the frame, these rods extend through collars 38 and a wing nut 42 threaded on each rod 40 engages the associated collar whereby rotation of the wing nuts will move the jaw 36 toward the jaw 34 to clamp the template blocks 44 therebetween, as will be appreciated from FIGS. 1, 2 and 4. Preferably, the jaw 36 is of a slight arcuate configuration convexly bowing in the direction of the jaw 34 whereby template blocks clamped at the central region of the template clamp 32 will be firmly held by the jaws 34 and 36.

The sign panel 46 to be routed is clamped in the sign clamp 48 between a pair of jaws 50 and 52 each formed of an angle iron of a length greater than the frame 10 whereby the ends of the jaws extend beyond the end rails 16. Tubular collars are welded to the underside of the jaws 50 and 52 for slidably receiving the threaded rods 40, and wing nuts 54 permit the jaw rails to be located as desired upon the table surface 20. Rotation of the wing nuts permits the jaws 50 and 52 to be tightly forced toward each other to clamp the sign panel 46 between the upright portions of the jaws. Preferably, nuts 56 are mounted upon the threaded shafts 40 for engagement with one end of the collars associated with jaw 50, and the associated wing nut forces the sleeve against the nut 56 to selectively "fix" the jaw 50 relative to the frame, and the jaw 50 will be adjusted so as to be parallel to the jaws of the template clamp 32. Thus, it is usually only necessary to adjust the wing nuts associated with jaw 52 to achieve clamping and unclamping of the sign panel 46, and unless major adjustments between the widths of the jaws 50 and 52 are required the position of jaw 50 will not be changed.

An elongated carriage 58 is mounted upon the track 26, and the carriage includes a set of rollers 60 adjacent each end thereof. The rollers 60 are preferably formed of nylon or similar material, and are each rotatably mounted upon a vertical bolt-shaft assembly 62 upon either sleeve or antifriction bearings, not shown. The rollers 60, at their lower portion 64 are substantially cylindrical, and each includes a concave shoulder portion 66 of a radius substantially equal to the radius of track rod 28 whereby the rollers and carriage are supported upon the track in a manner apparent from FIG. 3. This type of mounting of the carriage upon the track permits the carriage to be readily tilted with respect to the rod 28 about its longitudinal axis, and in fact, permits the carriage to be lifted from the track, if necessary, yet the carriage closely follows the track as it is linearally displaced thereon during cutting.

A cast bracket 68 is mounted upon the carriage 58 and includes V-shaped arms which, at their outer end, are attached by fasteners to the carriage at spaced locations to rigidly attach the bracket to the carriage. The bracket 70 is of an enlarged circular configuration and includes four bolts 72 whereby link 74 is rigidly attached to the bracket portion 70 in a non-pivotal manner.

The pantograph linkage, generally indicated at 76, in addition to link 74, includes link 78 and 80, and link 82. Link 78 is pivotally mounted to the bracket portion 70 by pivot pin 84 and includes integral boss 79 having a hole 81 formed therein, while link 80 is mounted to link 74 by pivot pin 86. The link 82 is pivotally mounted to the free ends of links 78 and 80 by pivot pins 88 and 90, respectively, and link 82 includes an integral boss 92 having a hole defined therein whereby the router 94 may be fixed to the link 82 in a predetermined angular relationship.

The links 74, 78, 80 and 82, in the commercial embodiment, are of a cast construction and include ribs 96 having vertical holes 98 defined therein. The holes 98 are spaced between the pivot holes defined at the ends of the links, and in FIG. 5 the various holes 98 have been given letter designations.

The construction of the template follower is best appreciated from FIG. 4 wherein it will be noted that the template follower basically comprises of a vertical threaded member 100 which is closely received within a link hole 98 and is fixed to the associated template by means of lock nuts 102 and 104 located on opposite sides of the associated link. At its lower end, the template follower is provided with a bearing block 108 preferably formed of nylon or other self-lubricating synthetic material tightly threaded upon the follower 100. The bearing block 108 includes a pointed end 106 and a lower surface 110 adapted to engage the flat upper surface 112 of the template block 44 being followed, and in this manner the bearing block supports much of the weight of the pantograph linkage 76, but prevents the template follower end from gouging or being unduly forced into the template groove 114. The bearing block assures ease of movement of the router during tracing and cutting.

The router 94 is of a conventional type except that its base plate 116 is provided with an ear and hole whereby it may be adjustably fixed to the link boss 92 by bolt 118. The router includes handles 120 which may be grasped, and an electric trigger switch, not shown, adjacent one of the handles permits the operator to start and stop the router while using the router to raise and lower the linkage 76, and exert those forces necessary on the linkage to translate the carriage 58 along track 26 and maintain the template follower 100 within the template groove 114.

In use, the operator chooses those template blocks 44 desired to form the words that are to be cut into the sign panel 46. The template blocks are placed between jaws 34 and 36, and tightening of the wing nuts 42 forces the jaw 36 against the template blocks to tightly clamp the blocks, and the bowed configuration of the jaw 36 assures that all of the blocks will be firmly held relative to the frame.

The operator then places the sign panel 46, usually a wood board, between jaws 50 and 52, and tightening of associated wing nuts 54 will clamp the sign board.

The template follower 100 is located within the desired hole 98 by means of the lock nuts 102 and 104, and the operator will grasp the router handles 120, raise the router 94 above the panel 46, move the router and linkage 76 to align to follower end 106 with the desired template groove 114, start the router motor, and lower the router, linkage and template follower so that the template follower end 106 enters the groove 114. The router is lowered onto the panel 46 until the router base plate 116 rests upon the panel and the operator then moves the router in those directions permitted by the follower 100. It will be appreciated that the raising and lowering of the router 94 and linkage 76 is achieved by pivoting of carriage 58 about the track rod 28, and the configuration of rollers 60 readily permits such pivoting. The operator will move the router so that the template follower fully travels the extent of the associated template groove and the router will cut the desired indicia into the sign panel. The operator then lifts the router from the sign panel, and the template follower from the template groove, moves the router to the right or left to align the follower 10 with the adjacent template block groove 114 and repeats the process to cut the next letter. The pivoted interconnection of the links permits ease of movement of the router as it follows the dictates of the template, and as the carriage 58 readily moves upon the track 26 ease of router movement is assured in all directions. When the cutting is completed the operator backs off wing nuts 54 and removes the sign panel 46 from the sign clamp 48. Unloosening of the wing nuts 42 permits the clamped template blocks 44 to be removed if a similar sign is not to be cut.

It is desired that pivoting of the linkage 76 be relatively free, but the interconnection between the links must be accurate and free of "play". The pivots 84, 86, 88 and 90 constitute threaded bolts having spring washers of the bellvue type, and it would be possible to use sleeve or antifriction bearings at the pivots, but such expensive constructions are not required.

A variety of letter configurations can be produced from a single style of templete merely by changing the position of the linkage pivots, and the position of the template follower. In FIG. 6 the STANDARD template and pivot positioning is utilized wherein the cut letters correspond to the block lettering of the templates, and it is to be understood that the modifications of FIGS. 7–11 are all cut from block letters similar to those shown in FIG. 6. To produce the STANDARD cutting of the FIG. 6 pivot 84 is located in holes A and C, pivot 86 in holes B and E, pivot 88 in holes D and G, pivot 90 in holes F and H, and the template follower 100 is located in hole I.

The SLANT configuration of indicia of FIG. 7 is produced by locating pivot 84 in holes A and C, pivot 86 in holes E and J, pivot 88 in holes D and G, pivot 90 in holes H and F, and the template follower in hole I. The lettering embodiment of FIG. 8 which inclines to the left and produces an arcuate vertical upright is achieved by positioning pivot 84 in holes A and C, pivot 86 in holes B and E, pivot 88 in holes G and K, pivot 90 in holes F and L, and the template is located in hole 81.

The RUSTIC configuration of FIG. 9 is achieved by placing pivot 84 in holes A and C, pivot 86 in holes E and J, pivot 88 in holes G and K, pivot 90 in holes F and H and the follower in hole 81.

FIG. 10 represents a LEFTY modification achieved by placing pivot 84 in holes A and C, pivot 86 in holes B and E, pivot 88 in holes D and G, pivot 90 in holes F and L and the follower in hole 81.

The SCRIPT modification of FIG. 11 is achieved by placing pivot 84 in holes A and C, pivot 86 in holes E and M, pivot 88 in holes D and G, pivot 90 in holes F and H and the template follower in hole I.

It will therefore be appreciated that the cutting machine of the invention may be operated by a relatively unskilled operator, provides excellent visibility during cutting, is of economical construction, and permits a wide variety of indicia modifications from the single template form. The conical end 106 will enter the template groove before the router tool engages the sign panel and this fact minimizes errors and the vertical flexibility of the linkage permits uneven sign panels to be cut.

It is understood that various modifications to the inventive concepts may be apparent to those skilled in the art without departing from the spirit and scope of the invention.

I claim:

1. A sign cutting machine comprising, in combination, a frame having an upper supporting surface, a rear edge and a front edge, first means for supporting a sign board to be routed upon said supporting surface adjacent said front edge, second means for supporting a template upon said supporting surface, a template supported upon said second means having a planar upper face and recesses defined in said face for receiving a template follower, a track mounted on said frame adjacent said rear edge comprising an enlongated shaft of circular cross section, a carriage mounted upon said track for movement thereon, said carriage including a plurality of contoured rollers located on opposite sides of said shaft mounted for rotation about an axis perpendicular to the longitudinal axis of said shaft and adapted to seat on said shaft and contact said shaft at the contoured portion and be lifted from said shaft permitting pivoting of said carriage about the length of said shaft and longitudinal movement along said shaft, a four-element linkage mounted upon said carriage extending over said supporting surface carriage, said linkages including a first rigid link connected to said carriage, second and third rigid links pivotally attached to said first link at spaced locations and a fourth rigid link pivotally attached to said second and third links, a plurality of spaced pivot receivable holes defined in each of said links having axes transversely disposed to the length of the associated link, an electrically driven router affixed to one of said links, and a template follower mounted on said linkage having a projection adapted to be received within said template recesses whereby said linkage may be removed through a pattern determined by said template recesses permitting said router to cut said sign board in a manner determined by said template, said template follower including template face engaging means mounted on said follower adjacent said projection for preventing excessive template follower projection forces on said recesses and being located intermediate said router and said carriage, said second means supporting said template being located intermediate said track and said first means supporting a sign board.

2. In a sign cutting machine as in claim 1 wherein said template face engaging means comprises a self-lubricating synthetic plastic member.

3. In a sign cutting machine as in claim 1, pivot pins pivotally interconnecting said links, said pivot pins comprising threaded bolts having nuts threaded thereon and spring washers mounted on said bolts maintaining a predetermined frictional engagement between interconnected links.

4. In a sign cutting machine as in claim 1 wherein said second means supporting said template includes an elongated holding bar having ends, adjustable force producing means located adjacent said bar ends selectively forcing said bar against said template, said bar being of an arcuate elongated configuration convexly extending toward said template.

* * * * *